(12) United States Patent
Nerding

(10) Patent No.: US 12,233,666 B2
(45) Date of Patent: Feb. 25, 2025

(54) MOBILE PART WITH AT LEAST ONE ATTACHMENT MODULE ARRANGED ON THE MOBILE PART

(71) Applicant: SEW-EURODRIVE GMBH & CO. KG, Bruchsal (DE)

(72) Inventor: Uwe Nerding, Bruchsal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 486 days.

(21) Appl. No.: 17/439,642

(22) PCT Filed: Feb. 20, 2020

(86) PCT No.: PCT/EP2020/025081
§ 371 (c)(1),
(2) Date: Sep. 15, 2021

(87) PCT Pub. No.: WO2020/187446
PCT Pub. Date: Sep. 24, 2020

(65) Prior Publication Data
US 2022/0185014 A1 Jun. 16, 2022

(30) Foreign Application Priority Data
Mar. 15, 2019 (DE) .......................... 102019001824.9

(51) Int. Cl.
*B60B 29/00* (2006.01)
(52) U.S. Cl.
CPC ................. *B60B 29/001* (2013.01)

(58) Field of Classification Search
CPC ................. B60B 29/001; B60B 29/002; Y10T 29/49721; Y10T 29/49718; Y10T 29/49817; Y10T 29/4973; Y10T 29/53443
See application file for complete search history.

(56) References Cited

U.S. PATENT DOCUMENTS

| | | | | |
|---|---|---|---|---|
| RE25,602 E | * | 6/1964 | Lyons | ..................... B60B 29/00 29/281.1 |
| 3,145,859 A | * | 8/1964 | Barosko | ................ B60B 29/002 414/427 |

(Continued)

FOREIGN PATENT DOCUMENTS

| | | |
|---|---|---|
| CN | 102884712 A | 1/2013 |
| CN | 103298625 A | 9/2013 |

(Continued)

OTHER PUBLICATIONS

International Search Report issued in corresponding International Application No. PCT/EP2020/025081, dated Apr. 2, 2020, pp. 1-2, English Translation.

*Primary Examiner* — Lawrence Averick
(74) *Attorney, Agent, or Firm* — Carter, DeLuca & Farrell LLP

(57) ABSTRACT

A mobile part includes at least one attachment module situated on the mobile part. The attachment module has a base plate and a wheel holding unit. A first linear axle is situated on the base plate, and a second linear axle is situated so as to be movable by the first linear axle. The wheel holding unit is situated so as to be movable via a third linear axle, which is situated so as to be movable by the second linear axle, and each one of the linear axles has a non-vanishing angle with respect to each of the other linear axles, in particular a right angle.

21 Claims, 4 Drawing Sheets

(56) References Cited

U.S. PATENT DOCUMENTS

| | | | | |
|---|---|---|---|---|
| 4,341,021 | A * | 7/1982 | Beissbarth | G01B 7/315 33/203.18 |
| 5,180,274 | A * | 1/1993 | Haugen | B66F 13/00 414/427 |
| 6,237,206 | B1 * | 5/2001 | Bezemer | B60B 29/002 29/273 |
| 7,431,314 | B2 * | 10/2008 | Donaldson | B60B 29/002 280/47.27 |
| 8,684,654 | B2 * | 4/2014 | Bardin | B60B 30/02 187/244 |
| 9,248,701 | B2 | 2/2016 | Calvi | |
| 9,391,468 | B2 | 7/2016 | Takada | |
| 10,112,648 | B2 * | 10/2018 | Tamura | B60W 30/146 |
| 10,909,132 | B2 * | 2/2021 | Costantino | G07C 5/008 |
| 11,433,494 | B2 * | 9/2022 | Phung | B60B 29/001 |
| 11,550,806 | B2 * | 1/2023 | Costantino | G06F 16/951 |
| 11,597,091 | B2 * | 3/2023 | Lawrence | G01S 7/4972 |
| 11,835,646 | B2 * | 12/2023 | Jefferies | G01B 11/275 |
| 2006/0082086 | A1 * | 4/2006 | Donaldson | B60B 29/002 280/47.27 |
| 2012/0057954 | A1 * | 3/2012 | Bardin | B60B 30/10 414/427 |
| 2017/0088176 | A1 * | 3/2017 | Tamura | B62D 15/025 |
| 2018/0357288 | A1 * | 12/2018 | Costantino | G06Q 10/20 |
| 2020/0130188 | A1 * | 4/2020 | Lawrence | G01S 7/4972 |
| 2021/0089522 | A1 * | 3/2021 | Costantino | G06F 16/248 |
| 2022/0018935 | A1 * | 1/2022 | Jefferies | G01B 11/2755 |

FOREIGN PATENT DOCUMENTS

| | | |
|---|---|---|
| CN | 203282964 U | 11/2013 |
| CN | 104985592 A | 10/2015 |
| DE | 2159082 A1 | 5/1973 |
| JP | H04-252702 A | 9/1992 |

\* cited by examiner

MOBILE PART WITH AT LEAST ONE ATTACHMENT MODULE ARRANGED ON THE MOBILE PART

FIELD OF THE INVENTION

The present invention relates to a mobile part with at least one attachment module arranged on the mobile part.

BACKGROUND INFORMATION

German Patent Document No. 21 59 082 describes a driveless wheel-mounting jack that is able to be moved by an operator.

In certain conventional systems, mobile parts arranged as driverless transport systems can be used in a plant for internal transport purposes.

SUMMARY

Example embodiments of the present invention improve automation in the motor vehicle industry.

According to an example embodiment of the present invention, a mobile part includes at least one attachment module arranged, e.g., mounted, on the mobile part. The attachment module has a base plate and a wheel holding unit. A first linear axle is situated on the base plate, and a second linear axle is situated so as to be movable by the first linear axle. The wheel holding unit is situated so as to be movable via a third linear axle, which is situated so as to be movable by the second linear axle. Each of the linear axles has a non-vanishing angle with respect to each of the other linear axles, in particular a right angle.

This has the advantage that the mobile part transports the wheel from the warehouse and a precise positioning is possible in addition. Thus, the mobile part has to carry out only a positioning down to a centimeter, and a positioning down to a millimeter is able to be performed by operating the linear axles.

According to example embodiments, the respective linear axle is arranged as a linear guide or as a linear actuator, e.g., a linear motor. This has the advantage that a fully automatic fine positioning is able to be carried out. The screw-fitting of the screw nuts for fastening the wheel to the shaft flange part is therefore able to be carried out by a robot, which uses a suitable screwdriver instead of a laborer.

According to example embodiments, the base plate is connected to the undercarriage of the mobile part, the base plate, e.g., being connected to the upper side of the undercarriage, e.g., connected with the aid of screws. This has the advantage that a simple but secure accommodation of the attachment module on the upper side of the undercarriage of the mobile part is possible.

According to example embodiments, a linear axle or a plurality of linear axles is able to be locked in position, e.g., with the aid of a single locking pin. This has the advantage of providing greater safety. As a result, an accidental disengagement of the wheel while the mobile part is in motion is able to be prevented.

According to example embodiments, the wheel holding unit has a, e.g., concave holding area for a wheel. This has the advantage that self-centering is achievable.

According to example embodiments, the holding area has a concave configuration. This offers the advantage that the wheel is supported in a self-centering manner.

According to example embodiments, the holding area has rollers so that the wheel accommodated in the holding area is rotatable about its wheel axle substantially without force as long as the wheel is not screwed to a shaft part of a motor vehicle. This has the advantage that the wheel is not only accommodated in the concave holding area in a self-centering manner but is also rotatable.

According to example embodiments, on the side of the wheel holding part facing away from the third linear axle, a restricting part restricts the wheel that is accommodated in the holding area, e.g., in the axial direction, that is to say, in the direction of the wheel axle. This is considered advantageous insofar as the wheel is prevented from dropping off.

According to example embodiments, on its underside the mobile part has a secondary winding for the contactless transmission of electric power from a long primary conductor installed on the floor, i.e., on the movement plane, to the secondary winding. This has the advantage of allowing for a contactless transmission of electrical energy.

According to example embodiments, the mobile part has a control by which a steering assembly and a drive of the mobile part are controllable. This has the advantage that the mobile part is able to be used as an automatically controlled vehicle or as a driverless transport system.

According to example embodiments, a handle bar is firmly connected to the wheel holding part. This has the advantage that a simple and secure positioning is implementable.

According to example embodiments, one of the linear axles, e.g., the third linear axle, functions as a lifting device for the wheel holding unit, and the lifting device includes a counterweight so that the positioning of the wheel holding unit is substantially possible without exerting force. This is considered advantageous insofar as a force-free positioning is possible and thus only frictional forces but no gravitational forces have to be overcome.

According to an example embodiment of the present invention, in a method for installing a wheel on a motor vehicle with the aid of a mobile part, the mobile part transports a wheel that is accommodated in a wheel holding unit of the attachment module to the installation region. In the installation region, the wheel is installed on the motor vehicle, e.g., on a shaft flange part of the motor vehicle: in that a locking mechanism, e.g., a locking pin, is first released, in that the wheel is then shifted in a force-free manner to a position in which the wheel is aligned with the axis of rotation of a shaft flange part, and in that the wheel is finally installed on the shaft flange part, e.g., with the aid of screw nuts and screws.

This has the advantage that the wheel is able to be brought from the warehouse in an automated manner and brought into the installation position without the use of force.

According to example embodiments, the locking is monitored by a sensor and the further driving of the mobile part takes place as a function of the signal from the sensor. This has the advantage of further improving the safety.

Further features and aspects of example embodiments of the present invention are described in greater detail below with reference to the appended schematic Figures.

DETAILED DESCRIPTION

Figure 1:
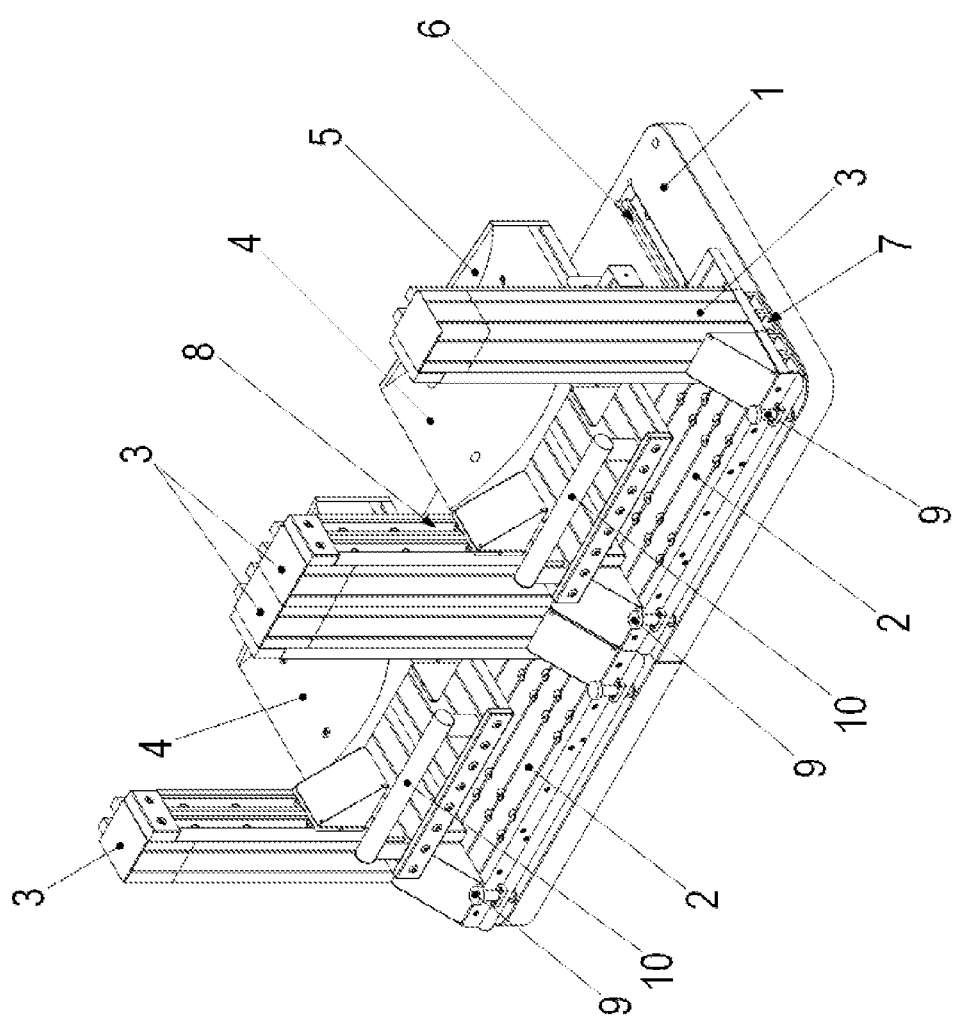
FIG. 1 is a schematic perspective view of two attachment modules according to an example embodiment of the present invention for an intralogistics mobile part.
Figure 2:
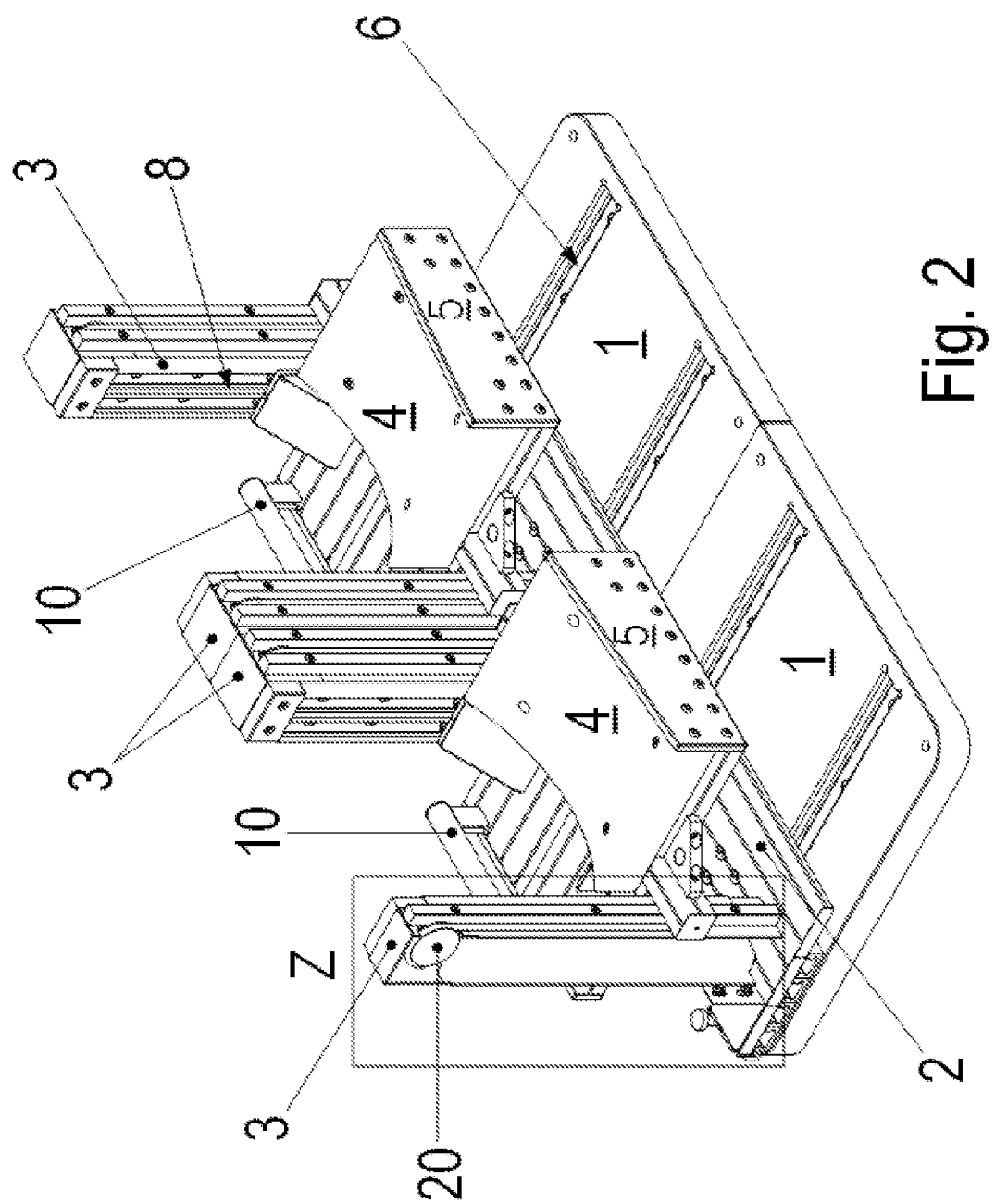
FIG. 2 is a schematic partial cross-sectional perspective view of the attachment modules from a different point of view.
Figure 3:
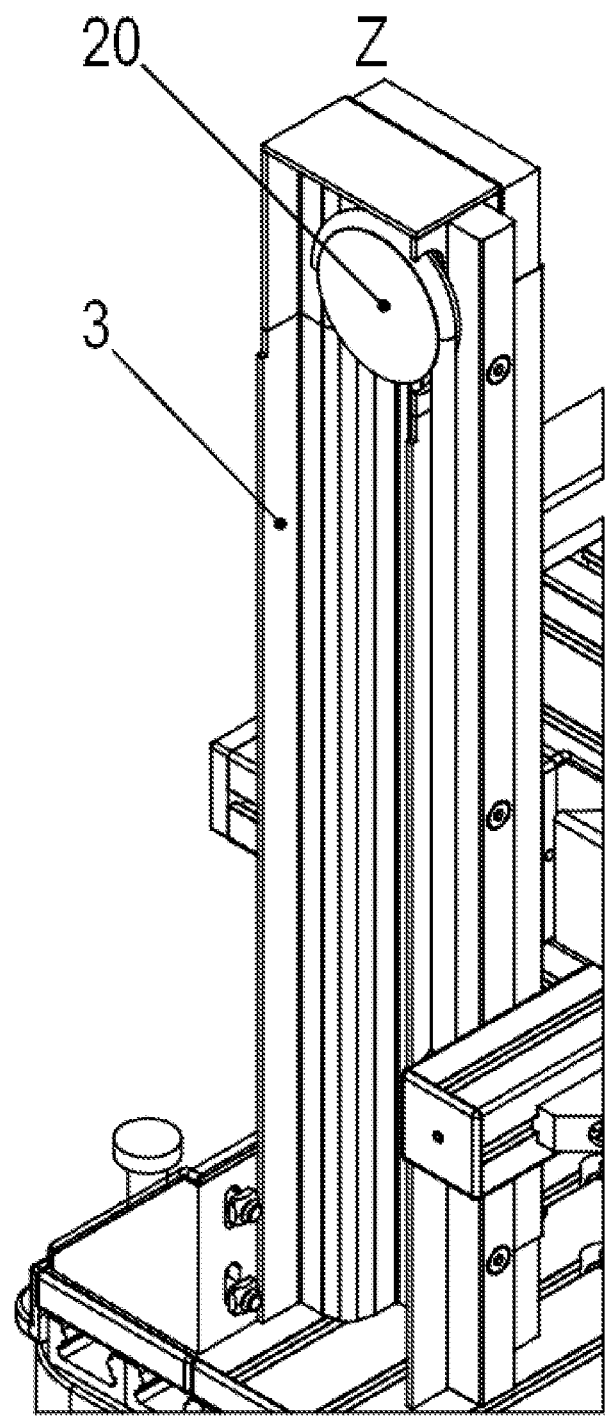
FIG. 3 schematically illustrates an enlarged portion of FIG. 2.
Figure 4:
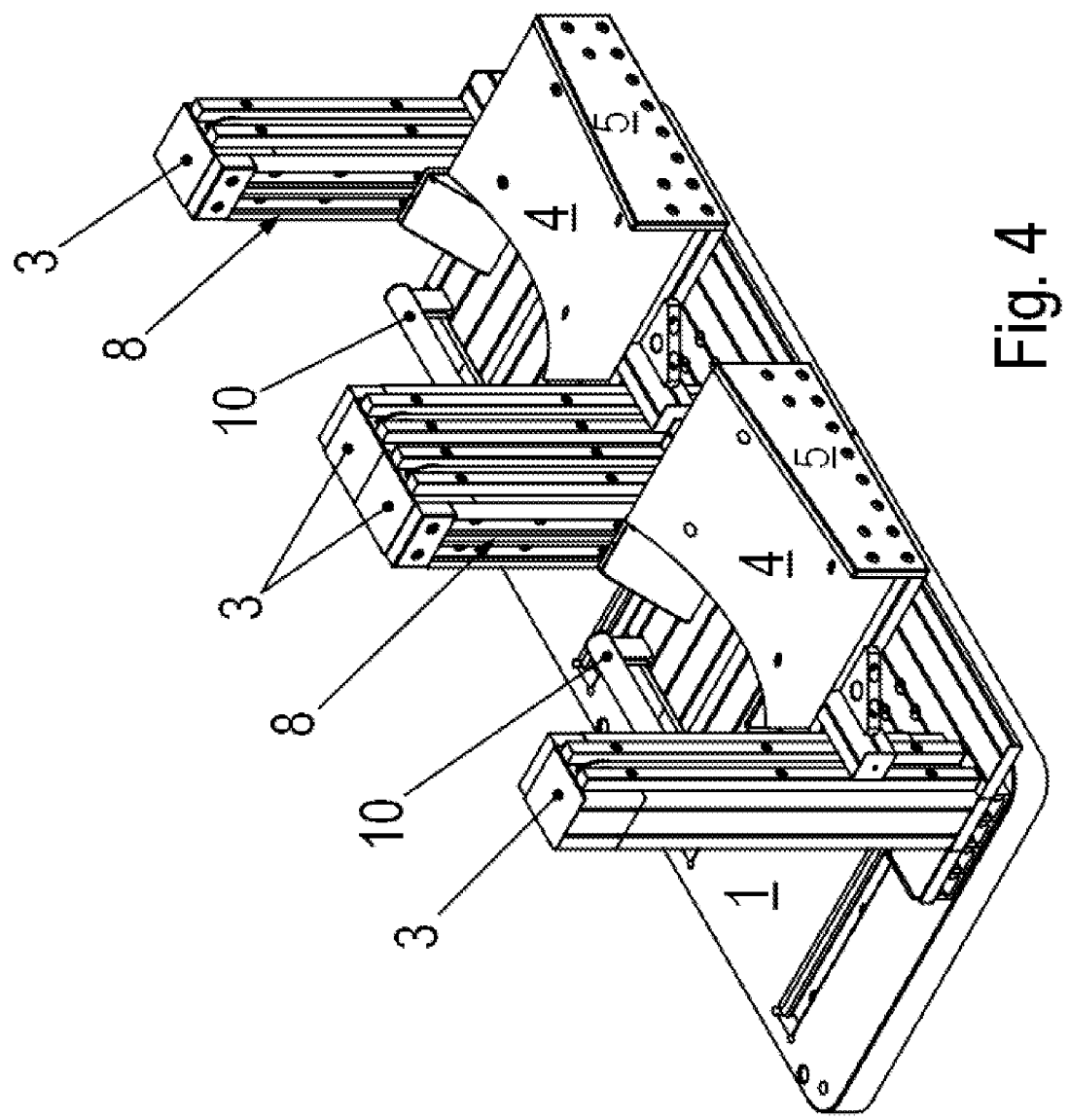
FIG. 4 schematically illustrates shows the attachment modules in a different position.

As schematically illustrated in the Figures, the two attachment modules have the same configuration and are thus identical.

A mobile part accommodates the attachment modules on its upper side.

The mobile part has a drive, e.g., a traction drive, a steering assembly, an energy store, and a control. In addition, a secondary coil is situated on the underside of the mobile part, which is able to be inductively coupled with a long primary conductor installed on the floor into which an alternating current is impressed.

A capacitance is arranged in series or in parallel with the secondary coil so that the resonant frequency of the oscillating circuit created in this manner way is similar to the frequency of the alternating current. Thus, electrical power is able to be transmitted from the primary conductor to the mobile part with high efficiency even if the inductive coupling is weak and/or fluctuating.

From the oscillating circuit, the energy store is supplied via a rectifier and a DC/DC converter and/or charge controller.

The drive, e.g., an electric motor driving at least one wheel of the mobile part, as well as the control and steering assembly are supplied from the energy store.

The attachment modules, e.g., a respective base plate 1 of the individual attachment module, are mounted on the upper side of the mobile part in each case, e.g., using screws.

The mobile part performs transports within a plant. For instance, it drives into a warehouse where it is loaded with a wheel or a plurality of wheels.

A wheel, e.g., a wheel of a motor vehicle such as a passenger car, truck, etc., is accommodated on a wheel holding part 4 of the attachment module.

The mobile part then drives on its own, that is to say, automatically, to an installation position, e.g., along the primary conductor installed on the floor. The wheel holding part 4 together with the wheel is positioned there such that the axis of rotation of the wheel is aligned with a shaft flange, e.g., of the motor vehicle, and thus is able to be screwed to the shaft flange with the aid of screw nuts screwed onto threaded pins.

For the positioning, wheel holding part 4 is able to be moved relative to base plate 1 with the aid of three linear guides which are aligned perpendicular to one another in each case.

Base plate 1 is screwed to the upper side, e.g., of the undercarriage, of the mobile part with the aid of screws.

Base plate 1 has a groove in which first linear guide 6 is situated. The linear axle extends in parallel with the axle of the wheel.

First linear guide 6 has a guide vehicle which is linearly moveable in the groove. The guide vehicle has additional wheels on its side facing away from the base plate, which are linearly movable in a groove of a sliding plate. A second linear guide is obtained as a result.

The groove of sliding plate 2 has a perpendicular alignment to the groove of base plate 1.

Fixed in position on sliding plate 2 are support columns 3, which have a rope pulley 20 that guides a rope which at its first end is connected to wheel holding part 4 and at its other end to a counterweight.

The support columns have the third linear guide, which is aligned perpendicular to the first and perpendicular to the second linear guide. Because of the counterweight, a substantially force-free repositioning of wheel holding unit 4 together with an accommodated wheel is possible.

The support columns also prevent tilting of the mounted wheel, and a restricting part 5 on the side of wheel holding part 4 facing away from support columns 3 functions as a restriction and/or as a tilting protection.

After the wheel has been screwed to the shaft flange, wheel holding unit 4 is slightly lowered and then moved to its base position again. Locking is achieved by a locking pin, which locks and/or fixates the relative position of sliding plate 2 with regard to base plate 1.

A handle bar 10 by which the accommodated wheel is able to be positioned substantially without force is fixed in position on wheel holding part 4.

According to example embodiments, the linear guides are replaced by linear actuators, that is to say, electromagnetically driven linear motors.

LIST OF REFERENCE NUMERALS 1 base plate
2 sliding plate
3 support column
4 wheel holding unit
5 restricting part
6 first linear guide
7 second linear guide
8 third linear guide
9 locking pin
10 handle bar

The invention claimed is:

1. A mobile part, comprising:
at least one attachment module arranged on the mobile part, the attachment module including a base plate and a wheel holding unit, a first linear axle being situated on the base plate, a second linear axle being movable by the first linear axle, the wheel holding unit being movable via a third linear axle, the third linear axle being movable by the second linear axle, each linear axle having a non-vanishing angle with respect to each other linear axle.

2. The mobile part according to claim 1, wherein the mobile part is movable on a floor.

3. The mobile part according to claim 1, wherein the attachment module is mounted on the mobile part.

4. The mobile part according to claim 1, wherein each linear axle is arranged at a right angle with respect to each other linear axle.

5. The mobile part according to claim 1, wherein the linear axles are arranged as linear guides, linear actuators, and/or linear motors.

6. The mobile part according to claim 1, wherein the base plate is connected to an undercarriage of the mobile part.

7. The mobile part according to claim 6, wherein the base plate is connected and/or screw-connected on an upper side of the undercarriage.

8. The mobile part according to claim 1, wherein at least one of the linear axles is lockable in position.

9. The mobile part according to claim 1, wherein at least one of the linear axles is lockable in position by a single locking pin.

10. The mobile part according to claim 1, wherein the wheel holding unit includes a holding area and/or a concave holding area adapted to accommodate a wheel.

11. The mobile part according to claim 10, wherein the holding area includes rollers so that the wheel accommodated in the holding area is rotatable about a wheel axle substantially without force as long as the wheel is not screwed to a shaft part of a motor vehicle.

12. The mobile part according to claim 10, wherein on a side of the wheel holding area facing away from the third linear axle, a restricting part restricts the wheel that is accommodated in the holding area in an axial direction and/or in a direction of the wheel axle.

13. The mobile part according to claim 1, wherein the mobile part includes a secondary winding on an underside of the mobile part adapted for contactless transmission of electrical power from a long primary conductor installed on a floor and/or on a movement plane to the secondary winding.

14. The mobile part according to claim 1, wherein the mobile part includes a control device adapted to control a steering assembly and a drive of the mobile part.

15. The mobile part according to claim 1, wherein a handle bar is firmly connected to the wheel holding unit.

16. The mobile part according to claim 1, wherein one of the linear axles and/or the third linear axle is arranged as a lifting device for the wheel holding unit, the lifting device including a counterweight so that a positioning of the wheel holding unit is possible substantially without force.

17. A method for installing a wheel on a motor vehicle with the aid of a mobile part as recited in claim 1, comprising:

transporting, by the mobile part, a wheel accommodated in the wheel holding unit of the attachment module to an installation region;
installing, in the installation region, the wheel on the motor vehicle and/or on a shaft flange part of the motor vehicle, including:
releasing a locking mechanism and/or a locking pin;
shifting the wheel in a force-free manner to a position in which the wheel is aligned with an axis of rotation of the shaft flange part; and
mounting the wheel on the shaft flange part.

18. The method according to claim 17, wherein the mounting includes mounting the wheel on the shaft flange part utilizing screw nuts and screws.

19. The method according to claim 17, further comprising monitoring the locking mechanism and/or the locking pin by a sensor, wherein further driving of the mobile part is performed as a function of a signal from the sensor.

20. The mobile part according to claim 1, wherein the mobile part includes a winding on an underside of the mobile part adapted for contactless transmission of electrical power from a long primary conductor installed on a floor and/or on a movement plane to the winding.

21. A mobile part, comprising:
at least one attachment module arranged on the mobile part, the attachment module including a base plate and a wheel holding unit, a first linear axle being situated on the base plate, a second linear axle being movable by the first linear axle, the wheel holding unit being movable via a third linear axle, the third linear axle being movable by the second linear axle, each linear axle arranged at a right angle with respect to each other linear axle.

* * * * *